3,423,473
METHOD FOR THE PREPARATION OF WAX
PHENOLS
John M. Walts, Clark, and Leslie M. Schenck, Mountainside, N.J., assignors to GAF Corporation, New York, N.Y., a corporation of Delaware
No Drawing. Filed June 28, 1966, Ser. No. 561,025
U.S. Cl. 260—619       6 Claims
Int. Cl. C07c 37/00

ABSTRACT OF THE DISCLOSURE

Wax phenols are obtained by heating a mixture which consists essentially of from 0.01 to about 12 parts by weight of a raw clay of the silica-alumina type and from 1 to 2 moles of a phenolic compound such as phenol, m-, o-, and p-cresol to a temperature of from about 125° to about 190° C. To the heated mixture is then added a chlorinated aliphatic hydrocarbon containing from about 12 to about 40 carbon atoms and from about 15 to 54% by weight of chlorine at a rate which precludes a large concentration of unreacted chlorinated aliphatic hydrocarbon while maintaining the said temperature range until the evolution of hydrogen chloride is substantially negligible. Thereafter the reaction mixture is cooled to a temperature of about 60°–125° C., while removing the said raw clay by filtration and recovering the wax phenol.

---

This invention relates to an improved method of preparing wax phenol compositions.

It is known that polymethylene polyphenols commonly referred to as wax phenols can be prepared by the reaction of phenol with a long-chain chlorinated hydrocarbon in the presence of aluminum chloride as catalyst. The disadvantage of aluminum chloride is that it must be added very slowly to the reaction mixture with active stirring so as to avoid violent foaming, while maintaining a gradual temperature control from about 150° F. up to 350° F. until the reaction is complete. Moreover, two extractions of the catalyst are required by the addition of 15% aqueous HCl to the alkylate, stirring at 95° C., and separating at 70° C. To overcome these disadvantages, it has been proposed to employ aluminum metal by mixing it with the phenol and then subsequently adding the long-chain chlorinated hydrocarbon.

Since aluminum chloride in contact with moisture results in the formation of traces of aluminum hydroxide which deactivates the catalytic activity (alkylation), the metallic aluminum avoids this problem. The phenol is generally heated at about 150° C. and a small amount of metallic aluminum added. To initiate the reaction a small crystal of iodine is introduced and the long-chain chlorinated hydrocarbon added, together with the remainder of the required amount of aluminum metal at a rate which avoids large concentrations of unreacted chlorinated hydrocarbon while maintaining a reaction temperature of from about 100° to about 200° C. The disadvantage of this process is that in order to remove the unhydrolyzed aluminum salts formed during the reaction, the reaction mixture is maintained at about 80° for several hours and the unhydrolyzed aluminum salts removed by precipitation and filtration prior to removal of unreacted phenol.

It is the principal object of the present invention to provide a simple and economical method of preparing wax phenols which does not involve the difficulties attended with the use of aluminum metal or Friedel Crafts catalysts.

Other objects and advantages will become evident from the following description.

We have found that phenol and m-, o-, or p-cresols are readily reacted with long-chain chlorinated hydrocarbons to form wax phenols by employing as the catalyst any raw clay of the silica-alumina type, such as bentonites, diatomaceous earth, fuller's earth, silica-alumina natural clays, montmorillonite clays, etc., without any prior activation, such as, for example, sulfuric acid or other activating acids. The economy of utilizing such unactivated (raw) clays, which are most plentiful and least expensive natural raw products available to the chemical industry, is self-apparent. Moreover, our process completely avoids the removal of catalyst by extraction and of unhydrolyzed aluminum salts by precipitation and filtration.

In carrying out our improved process, the proportions of phenol or cresol to the chlorine in the long-chain chlorinated hydrocarbon is from 0.1 to 4 atoms of chlorine in the chlorinated hydrocarbon per mole of phenol or cresol. Where a small amount of excess phenol or cresol remains in the reactions, it is removed from the reaction mixture by simple distillation in vacuo or by steam distillation. Instead of wax phenols, we may, by our process, also form monoalkylated products of the phenol or cresol with the long-chain chlorinated hydrocarbon.

In the actual carrying out of our improved process, from 1 to 2 moles of phenol or of either m-, o-, or p-cresol and from .01 to about 12 parts by weight of any raw clay of the silica-alumina type based on the weight of the long-chain chlorinated hydrocarbon is heated to a temperature ranging from about 125° to about 190° C. To the heated mixture there is then added a long-chain chlorinated hydrocarbon containing from 0.1 to 4 atoms of chlorine per mole of phenol or cresol at such rate that the evolved hydrogen chloride can be readily vented or absorbed in aqueous caustic soda. In other words, the addition should be in sufficient increments which will preclude a large concentration of unreacted chlorinated hydrocarbon in the reaction mixture.

When the addition of the long-chain chlorinated hydrocarbon is complete the reaction mixture is heated within the same temperature range for a period of time ranging from about 2 to about 20 hours during which the evolution of the hydrogen chloride ceases or becomes practically negligible. The reaction mixture is then cooled to a temperature ranging between 60° and 125° C., filtered to remove the clay catalyst and the filtrate distilled in vacuo or by steam distillation to remove any unreacted phenol or cresol. The composition of the resulting wax phenol or cresol is determined by percent of reaction which may range from about 75 to 100%.

When phenol, for example, is reacted with a long-chain chlorinated hydrocarbon, the resulting wax phenol may be characterized by the following formula:

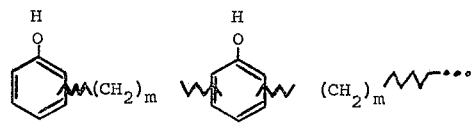

wherein the $m$'s consist of aliphatic chains having a plurality of randomly attached phenol groups at an average spacing which is determined jointly by the percent chlorine content of the parent chlorinated hydrocarbon and by the percent reaction (fraction of chlorine atoms replaced by the phenolic hydroxyl groups) in the alkylation. On the average each phenol group is alkylated by more than one alkyl chain. The degree of alkylation defines the extent of such polyalkylation of the phenolic hydroxyl nucleus.

The long-chain chlorinated hydrocarbons which are employed as the alkylating medium for the phenol or cresol may be easily prepared or may be any one of the commercially available chlorinated paraffins or chlorinated waxes which are usually and conveniently grouped into three main classes, i.e., the low range containing about 15 to about 28% chlorine, the middle range with a chlorine content of 30 to 40%, and the next higher chlorinated range with a chlorine content of 42 to 54%. The specific gravity of these liquid long-chain chlorinated paraffins or waxes increases with increased chlorine content. The hydrocarbon chain in such chlorinated hydrocarbons varies from about 12 to about 40 carbon atoms. Some of these are commercially available under the brand name of Chlorafin, a light, amber liquid of approximately 42–43% chlorine content; Paroil 143, a honey-to-amber liquid of approximately 43% chlorine content; Cereclor I and II, pale yellow liquids of approximate chlorine contents of 47 and 42% respectively; and Unichlor SV, 40, and 50, liquids of chlorine contents of approximately 39, 41.5, and 51%, respectively. Those with a lower percent of chlorine, i.e., from 15 to about 28%, can be very readily prepared by conventional procedures which consist of passing chlorine through molten paraffin wax or paraffinic hydrocarbons of 12 to 40 carbon atoms under control conditions giving off hydrogen chloride as a by-product. The products containing from 15 to 22% of chlorine are solid or semi-solid, and those containing from 22 to 54% of chlorine are usually viscous liquids. Chlorinated waxes having a chlorine content of from 15 to 54% by weight are readily prepared by the procedures described in German Patent 256,856 of Nov. 19, 1910; German Patent 673,521 of Aug. 12, 1934; U.S. Patent 2,022,619 of Nov. 26, 1935; and U.S. Patent 2,433,419 of Dec. 30, 1947.

The practice of our improved practice is best described by the following examples which are mainly illustrative and are not intended as limitations to the scope of the invention. All parts given are by weight unless otherwise noted.

EXAMPLE 1

210 grams of crude scale wax having a chain of about 25 carbon atoms was charged to a one-liter flask and heated above its melting point of 54–56° C. 121 grams of chlorine was added at the rate of 6.6 grams per hour and the reaction temperature maintained at 88° C. The analysis of the chlorinated hydrocarbon thus obtained indicated 20.3% chlorine by weight and an average of 2.5 chlorine atoms per $C_{25}$ chain.

To 141 grams (1.5 moles) of phenol and 2 grams of No. 49 Voldeg bentonite obtained from Whittaker, Clark & Daniels, heated to 165°–175° C., there were added over a period of 4½ hours 187 grams of the chlorinated hydrocarbon prepared above. The evolution of hydrogen chloride was quite evident during the course of the addition. When the addition was complete, the mixture was maintained at the same temperature for 16 hours during which the evolution of hydrogen chloride became substantially negligible. The reaction mixture was then cooled to 75° C., filtered to remove the clay, and the filtrate distilled in vacuo up to 248° C. (10 mm.) to remove unreacted phenol. The residue, a thick semi-solid weighing 180.5 grams, had a residual chloride content of 1.4% indicating that each phenol group was alkylated to the extent of 3.2 alkyl groups per phenol. The chlorowax equivalent was calculated to be 19.2.

Wax phenol composition:
Percent reaction _____ 93.5
Degree of alkylation _____ 3.20
Chlorowax equivalent _____ 19.2
Composition _____ 3.20–19/20.3

EXAMPLE 2

To 162 grams (1.5 moles) of p-cresol and 10 grams of Celite 503—Johns Manville—heated to 180–185° C., there were added over two hours 187 grams of the chlorinated hydrocarbon employed in Example 1. When the addition was complete, the mixture was heated five hours at 180–185° C., cooled, filtered and steam distilled to remove unreacted p-cresol. Analysis of the residue, weighing 200 grams, revealed 0.92% chlorine.

Wax phenol composition:
Percent reaction _____ 95
Degree of alkylation _____ 2.20
Chlorowax equivalent _____ 19.3
Composition _____ 2.2–19.3/20.3

EXAMPLE 3

Operating as in Example 1, but substituting 10 grams of BG100 Wyobond bentonite—Archer, Daniels and Miles—for No. 49 Voldeg bentonite and increasing the phenol to 470 grams (5 moles) yielded 220 grams of residue containing 1.2% chlorine.

Wax phenol composition:
Percent reaction _____ 94.3
Degree of alkylation _____ 1.37
Chlorowax equivalent _____ 18.9
Composition _____ 1.37–19.1/20.3

EXAMPLE 4

Operating as in Example 1, but substituting 1 gram of Aquagel bentonite—Baroid Division of National Lead—for No. 49 Voldeg bentonite, decreasing the reaction temperature to 135°–140° C. and steam stripping the unreacted phenol resulted in 190 grams of residue containing 3.0% chlorine.

Wax phenol composition:
Percent reaction _____ 85
Degree of alkylation _____ 2.42
Chlorowax equivalent _____ 17.2
Composition _____ 2.42–17.2/20.3

EXAMPLE 5

Operating as in Example 2, but substituting 540 grams (5 moles) of o- for p-cresol, yielded 235 grams of residue which analyzed as containing 1.05% chlorine.

Wax phenol composition:
Percent reaction _____ 93.8
Degree of alkylation _____ 1.12
Chlorowax equivalent _____ 19
Composition _____ 1.12–19/20.3

EXAMPLE 6

Repeating Example 5 with m-cresol yielded 260 grams of residue which analyzed as containing 3.6% chlorine.

Wax phenol composition:
Percent reaction _____ 75.5
Degree of alkylation _____ 0.85
Chlorowax equivalent _____ 15.3
Composition _____ 0.85–15.3/20.3

EXAMPLE 7

To 188 grams (2.0 moles) of phenol and 12 grams of No. 49 Voldeg bentonite—Whittaker, Clark & Daniels—heated to 150–160° C., there were added over 2 hours 100 grams of Unichlor SV (percent chlorine=39%) obtained from the Neville Chemical Company. After the addition was complete, the mixture was maintained at the same temperature for 14 hours during which time the evolution of hydrogen chloride became negligible. The reaction mixture was then cooled to 110° C. over a two-hour period with nitrogen bubbling through the mixture and filtered. The filtrate was steam distilled to remove unreacted phenol and the residue which weighed 160 grams had a chlorine content of 2.5%.

Wax phenol composition:
Percent reaction _____ 89.8
Degree of alkylation _____ 0.97
Chlorowax equivalent _____ 35.0
Composition _____ 0.97–35.0/39.0

EXAMPLE 8

Operating as in Example 7 but substituting 100 grams of Unichlor 50 (percent Cl=51%) for Unichlor SV there was obtained a yield of 175 grams of product which analyzed as containing 2.0% chlorine.

Wax phenol composition:
| | |
|---|---|
| Percent reaction | 93 |
| Degree of alkylation | 1.03 |
| Chlorowax equivalent | 47.5 |
| Composition | 1.03–47.5/51.0 |

As is well-known, the wax phenols prepared in accordance with the present invention are useful as pourpoint depressants in lube oils and as intermediates in the condensation reaction with aldehydes to yield resinous products for paints and varnishes.

We claim:

1. A method of preparing wax phenols which consists essentially of reacting by heating a mixture consisting of from 0.01 to about 12 parts by weight of a raw clay of the silica-alumina type and from 1 to 2 moles of a phenolic compound of the class consisting of phenol, m-, o-, and p-cresol to a temperature ranging between from about 125° to about 190° C., adding to the heated mixture a chlorinated aliphatic hydrocarbon containing from about 12 to about 40 carbon atoms and from about 15 to 54% by weight of chlorine at a rate which precludes a large concentration of unreacted chlorinated aliphatic hydrocarbon while maintaining the said temperature range until the evolution of hydrogen chloride is substantially negligible, cooling the reaction mixture to a temperature of about 60°–125° C., removing the said raw clay by filtration and recovering the wax phenol.

2. A method according to claim 1 wherein the phenolic compound is phenol.

3. A method according to claim 1 wherein the phenolic compound is p-cresol.

4. A method according to claim 1 wherein the phenolic compound is m-cresol.

5. A method according to claim 1 wherein the phenolic compound is o-cresol.

6. A method according to claim 1 wherein the chlorinated aliphatic hydrocarbon contains about 25 carbon atoms and 20.3% by weight of chlorine.

References Cited

UNITED STATES PATENTS

| | | | |
|---|---|---|---|
| 3,342,895 | 9/1967 | Schmitz-Josten et al. | 260—61 X |
| 3,148,159 | 9/1964 | Hodgkiss | 252—455 X |
| 2,361,355 | 10/1944 | Sachanen et al. | 260—624 X |

LEON ZITVER, *Primary Examiner.*

H. ROBERTS, *Assistant Examiner.*

U.S. Cl. X.R.

260—61, 624